(12) United States Patent
Menedez-Pidal et al.

(10) Patent No.: US 6,970,818 B2
(45) Date of Patent: Nov. 29, 2005

(54) METHODOLOGY FOR IMPLEMENTING A VOCABULARY SET FOR USE IN A SPEECH RECOGNITION SYSTEM

(75) Inventors: Xavier Menedez-Pidal, Los Gatos, CA (US); Lex S. Olorenshaw, Corte Madera, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 769 days.

(21) Appl. No.: 10/097,962

(22) Filed: Mar. 14, 2002

(65) Prior Publication Data

US 2003/0110031 A1 Jun. 12, 2003

Related U.S. Application Data

(60) Provisional application No. 60/340,532, filed on Dec. 7, 2001.

(51) Int. Cl.[7] .............................................. G10L 15/04
(52) U.S. Cl. ...................... 704/236; 704/255
(58) Field of Search ............................... 704/231, 236, 704/240, 242, 243, 251–257

(56) References Cited

U.S. PATENT DOCUMENTS 6,018,708 A * 1/2000 Dahan et al. ............... 704/244
6,167,377 A * 12/2000 Gillick et al. ............... 704/240
6,205,426 B1 * 3/2001 Nguyen et al. ............. 704/255

* cited by examiner

Primary Examiner—Abul K. Azad
(74) Attorney, Agent, or Firm—Gregory J. Koerner; Redwood Patent Law

(57) ABSTRACT

The present invention comprises a methodology for implementing a vocabulary set for use in a speech recognition system, and may preferably include a recognizer for analyzing utterances from the vocabulary set to generate N-best lists of recognition candidates. The N-best lists may then be utilized to create an acoustical matrix configured to relate said utterances to top recognition candidates from said N-best lists, as well as a lexical matrix configured to relate the utterances to the top recognition candidates from the N-best lists only when second-highest recognition candidates from the N-best lists are correct recognition results. An utterance ranking may then preferably be created according to composite individual error/accuracy values for each of the utterances. The composite individual error/accuracy values may preferably be derived from both the acoustical matrix and the lexical matrix. Lowest-ranked utterances from the foregoing utterance ranking may preferably be repeatedly eliminated from the vocabulary set when a total error/accuracy value for all of the utterances fails to exceed a predetermined threshold value.

43 Claims, 10 Drawing Sheets

METHODOLOGY FOR IMPLEMENTING A VOCABULARY SET FOR USE IN A SPEECH RECOGNITION SYSTEM

This application claims benefit of 60/340,532, filed Dec. 7, 2001.

BACKGROUND SECTION

1. Field of the Invention

This invention relates generally to electronic speech recognition systems, and relates more particularly to a methodology for implementing a vocabulary set for use in a speech recognition system.

2. Description of the Background Art

Implementing effective methods for interacting with electronic devices is a significant consideration for designers and manufacturers of contemporary electronic systems. However, effectively interacting with electronic devices may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively performs various speech recognition procedures may benefit from an efficient implementation because of the large amount and complexity of the digital data involved.

In certain environments, voice-controlled operation of electronic devices is a desirable interface for many system users. Voice-controlled operation of electronic devices may be implemented by various speech-activated electronic systems. Voice-controlled electronic systems allow users to interface with electronic devices in situations where it would not be convenient to utilize a traditional input device. A voice-controlled system may have a limited vocabulary of words that the system is programmed to recognize.

Due to growing demands on system resources and substantially increasing data magnitudes, it is apparent that developing new techniques for interacting with electronic devices is a matter of concern for related electronic technologies. Therefore, for all the foregoing reasons, developing effective systems for interacting with electronic devices remains a significant consideration for designers, manufacturers, and users of contemporary electronic systems.

SUMMARY

In accordance with the present invention, a methodology is disclosed for implementing a vocabulary set for use in a speech recognition system. In one embodiment, initially, a system designer or other appropriate entity may preferably define an initial set of utterances for use with a speech detector from the speech recognition system. In certain embodiments, the initial set of utterances may preferably include various tasks for recognition by the speech detector, and may also preferably include alternate commands corresponding to each of the various tasks.

A recognizer from the speech recognizer may preferably analyze each utterance by comparing the utterances to word models of a vocabulary set from a word model bank to thereby generate a corresponding model score for each of the utterances. Then, the recognizer may preferably generate an N-best list for each utterance based upon the model scores.

An acoustical matrix and a lexical matrix corresponding to corresponding recognition results may preferably be created by utilizing any appropriate means. For example, the acoustical matrix and lexical matrix may be created by utilizing the foregoing N-best lists. Next, individual error/accuracy values may preferably be determined for all utterances by utilizing any effective means. For example, in certain embodiments, composite individual error/accuracy values may preferably be determined by utilizing both the acoustical matrix and the lexical matrix.

All utterances may then be ranked in an utterance ranking according to individual error/accuracy values that may preferably be derived from both the acoustical matrix and the lexical matrix. Next, a total error/accuracy value for all utterances may be determined by utilizing acoustical matrix values from the acoustical matrix.

The foregoing total error/accuracy value may preferably be compared with a predetermined threshold value which may be selected to provide a desired level of recognition accuracy for the speech detector. If the predetermined threshold value has been exceeded by the total error/accuracy value, then the process may preferably terminate. However, if the predetermined threshold value has not been exceeded by the total error/accuracy value, then a lowest-ranked utterance from the utterance ranking may preferably be eliminated from the vocabulary set. Next, acoustical matrix values from the acoustical matrix and lexical matrix values from the lexical matrix may preferably be set to zero for the eliminated lowest-ranked utterance to thereby generate an updated acoustical matrix and an updated lexical matrix.

The total error/accuracy value for all remaining utterances may preferably be recalculated by using acoustical matrix values from the updated acoustical matrix. The present invention may then preferably return to repeatedly eliminate lowest-ranked utterances from the utterance ranking until the predetermined threshold value is exceeded, and the process terminates. The present invention thus provides an improved methodology for implementing a vocabulary set for use in a speech recognition system.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a methodology for implementing a vocabulary set for use in a speech recognition system, and may preferably include a recognizer for analyzing utterances from the vocabulary set to generate N-best lists of recognition candidates. The N-best lists may then be utilized to create an acoustical matrix configured to relate said utterances to top recognition candidates from said N-best lists, as well as a lexical matrix configured to relate the utterances to the top recognition candidates from the N-best lists only when second-highest recognition candidates from the N-best lists are correct recognition results.

An utterance ranking may then preferably be created according to composite individual error/accuracy values for each of the utterances. The composite individual error/accuracy values may preferably be derived from both the acoustical matrix and the lexical matrix. Lowest-ranked utterances from the foregoing utterance ranking may preferably be repeatedly eliminated from the vocabulary set when a total error/accuracy value for all of the utterances fails to exceed a predetermined threshold value.

Figure 1:
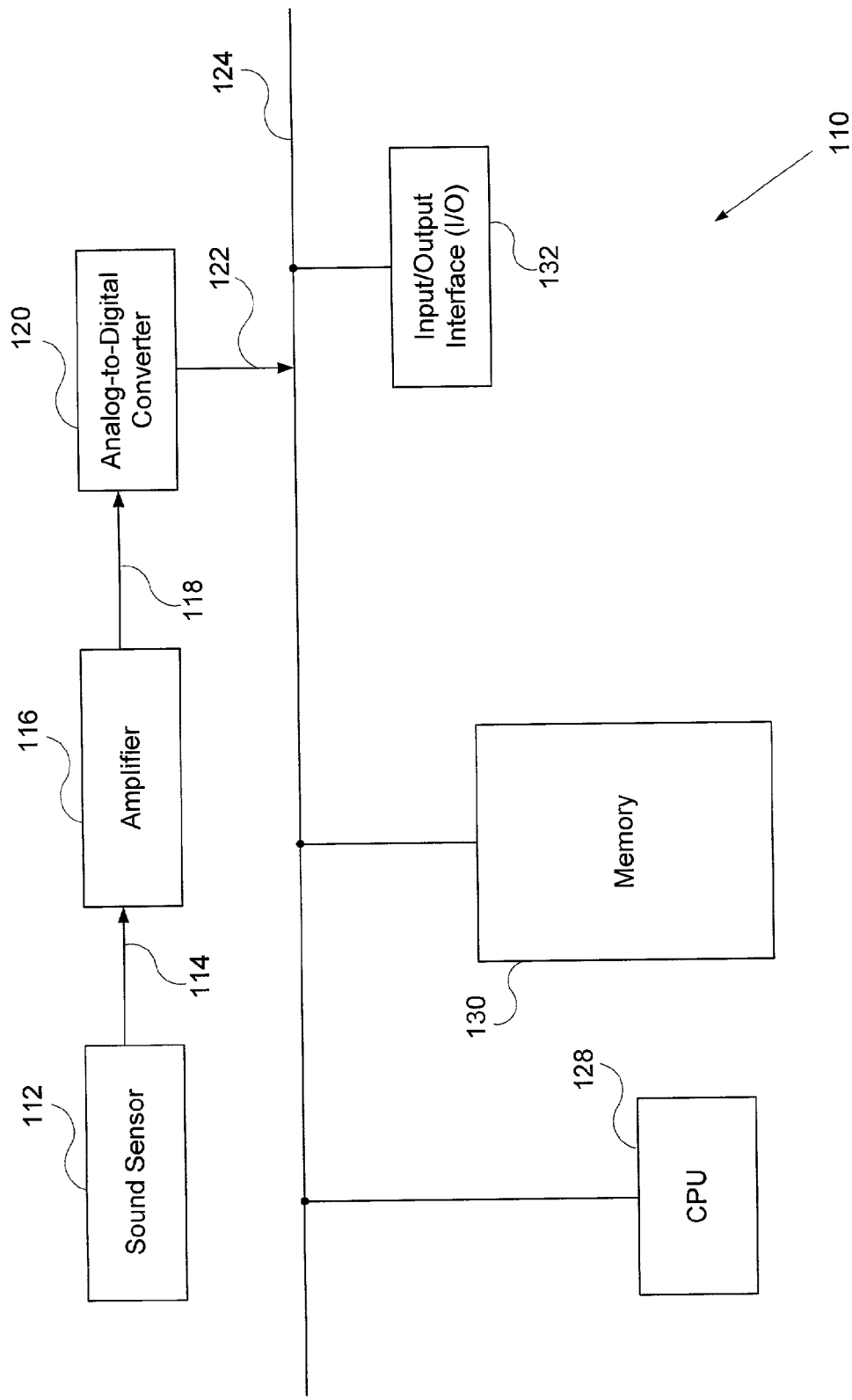
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2 through 8B. After the speech data is processed, CPU 128 may then provide the results of the speech detection analysis to other devices (not shown) via input/output interface 132.

Figure 2:
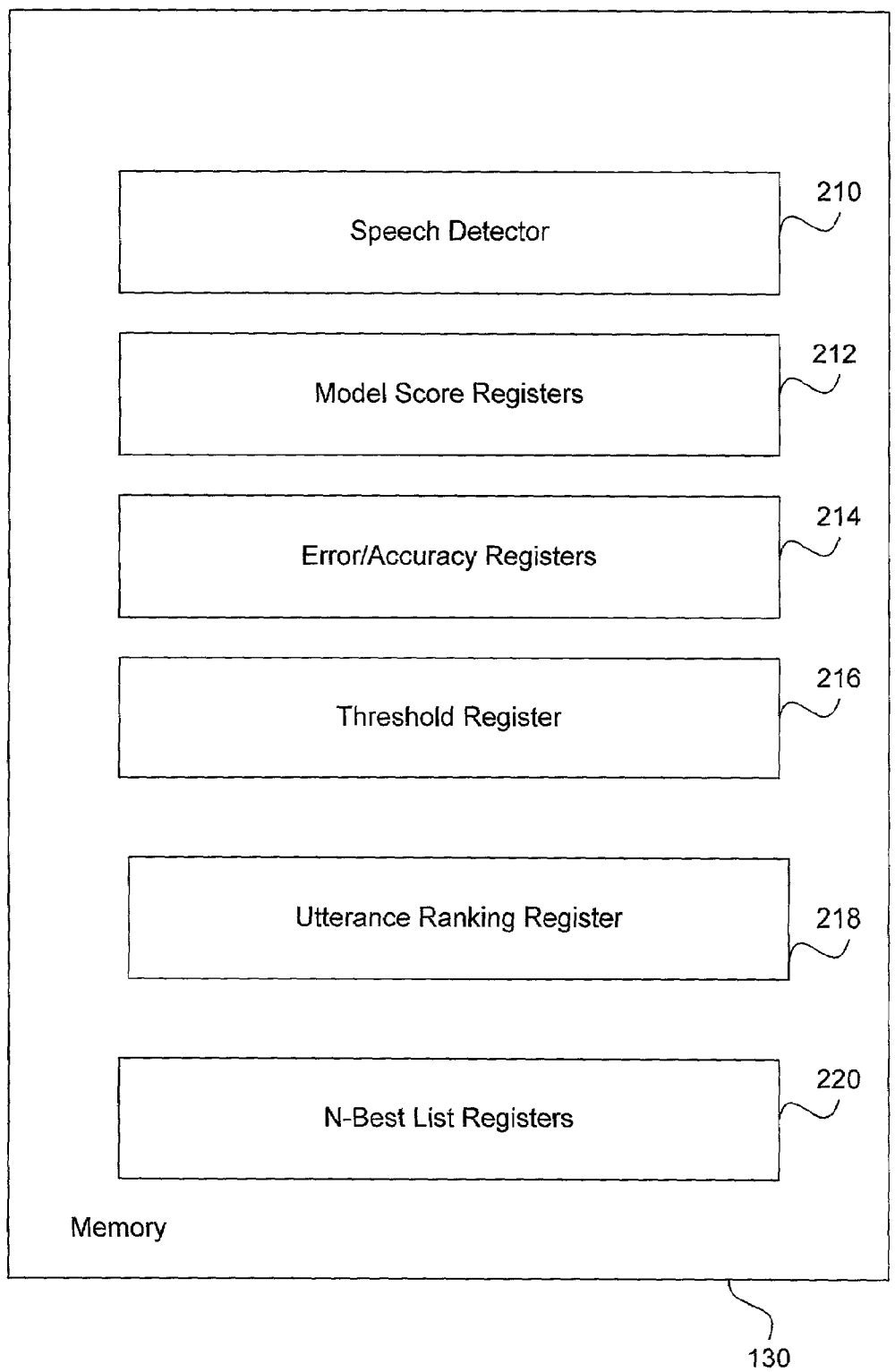
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech detector 210, model score registers 212, error/accuracy registers 214, a threshold register 216, an utterance ranking register 218, and N-best list registers 220.

In the FIG. 2 embodiment, speech detector 210 includes a series of software modules that are executed by CPU 128 to analyze and detect speech data, and which are further described below in conjunction with FIGS. 3–4. In alternate embodiments, speech detector 210 may readily be implemented using various other software and/or hardware configurations.

Model score registers 212, error/accuracy registers 214, threshold register 216, utterance ranking register 218, and N-best list registers 220 may preferably contain respective variable values that are calculated and utilized by speech detector 210 to implement the speech recognition process of the present invention. The utilization and functionality of model score registers 212, error/accuracy registers 214, threshold register 216, utterance ranking register 218, and N-best list registers 220 are further discussed below in conjunction with FIGS. 3 through 8B.

Figure 3:
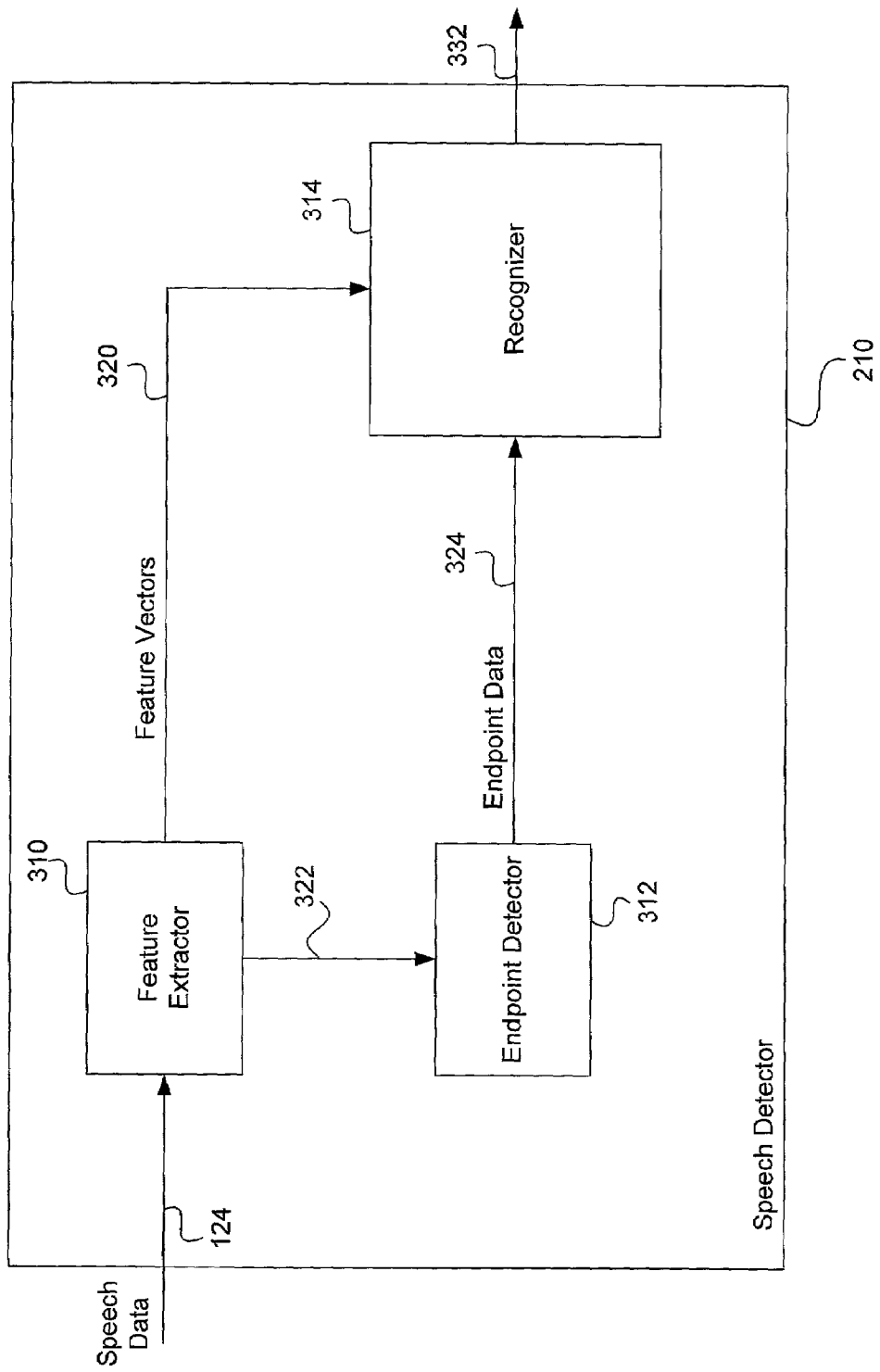
FIG. 3 is a block diagram for one embodiment of the speech detector of FIG. 2, in accordance with the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314.

Analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize isolated words or commands in a predetermined vocabulary set of system 110. In the FIG. 3 embodiment, recognizer 314 is configured to recognize a vocabulary set of approximately 200 words, utterances, or commands. However, a vocabulary set including any number of words, utterances, or commands is within the scope of the present invention. The foregoing vocabulary set may correspond to any desired commands, instructions, or other communications for system 110.

Figure 4:
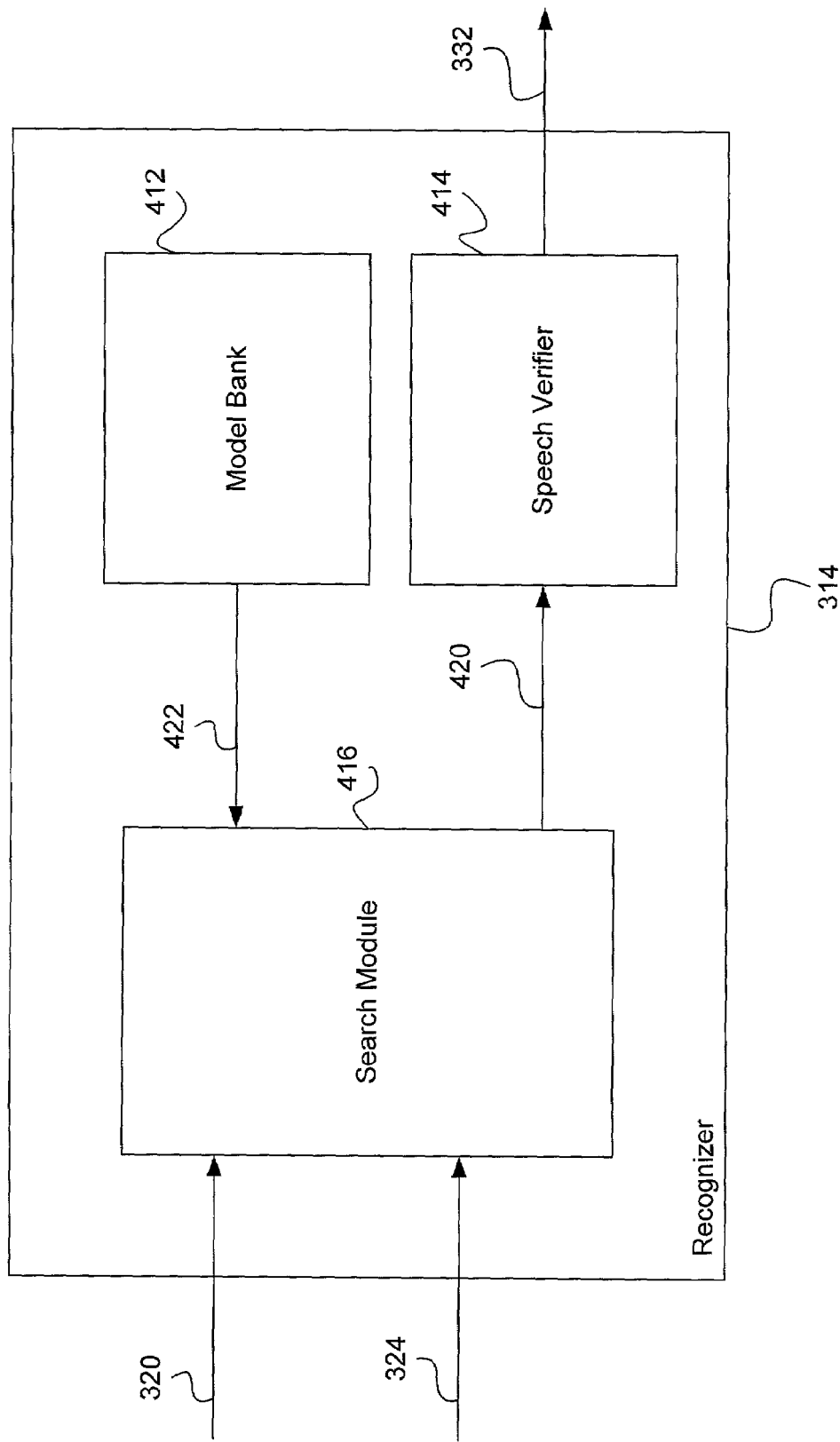
FIG. 4 is a block diagram for one embodiment of the recognizer of FIG. 3, in accordance with the present invention.

Referring now to FIG. 4, a block diagram for one embodiment of the recognizer 314 of FIG. 3 is shown, according to the present invention. Recognizer 314 includes, but is not limited to, a search module 416, a model bank 412, and a speech verifier 414. Model bank 412 includes a word model for every word or command in the vocabulary set of system 110. Each model may preferably be a Hidden Markov Model that has been trained to recognize a specific word or command in the vocabulary set.

Search module 416 preferably receives feature vectors from feature extractor 310 via path 320, and receives endpoint data from endpoint detector 312 via path 324. Search module 416 compares the feature vectors for an utterance (the signal between endpoints) with each word model in model bank 412. Search module 416 produces a recognition score for the utterance from each model, and stores the recognition scores in model score registers 212.

Search module 416 preferably ranks the recognition scores for the utterance from highest to lowest, and stores a specified number of the ranked recognition scores as an N-best list in N-best list registers 220. The word model that corresponds to the highest recognition score is the first recognition candidate, the word model that corresponds to the next-highest recognition score is the second recognition candidate, the word model that corresponds to the third-highest recognition score is the third recognition candidate. Typically, the first recognition candidate is considered to be the recognized word. The operation and utilization of recognizer 314 is further discussed below in conjunction with FIGS. 5 through 8B.

Figure 5:
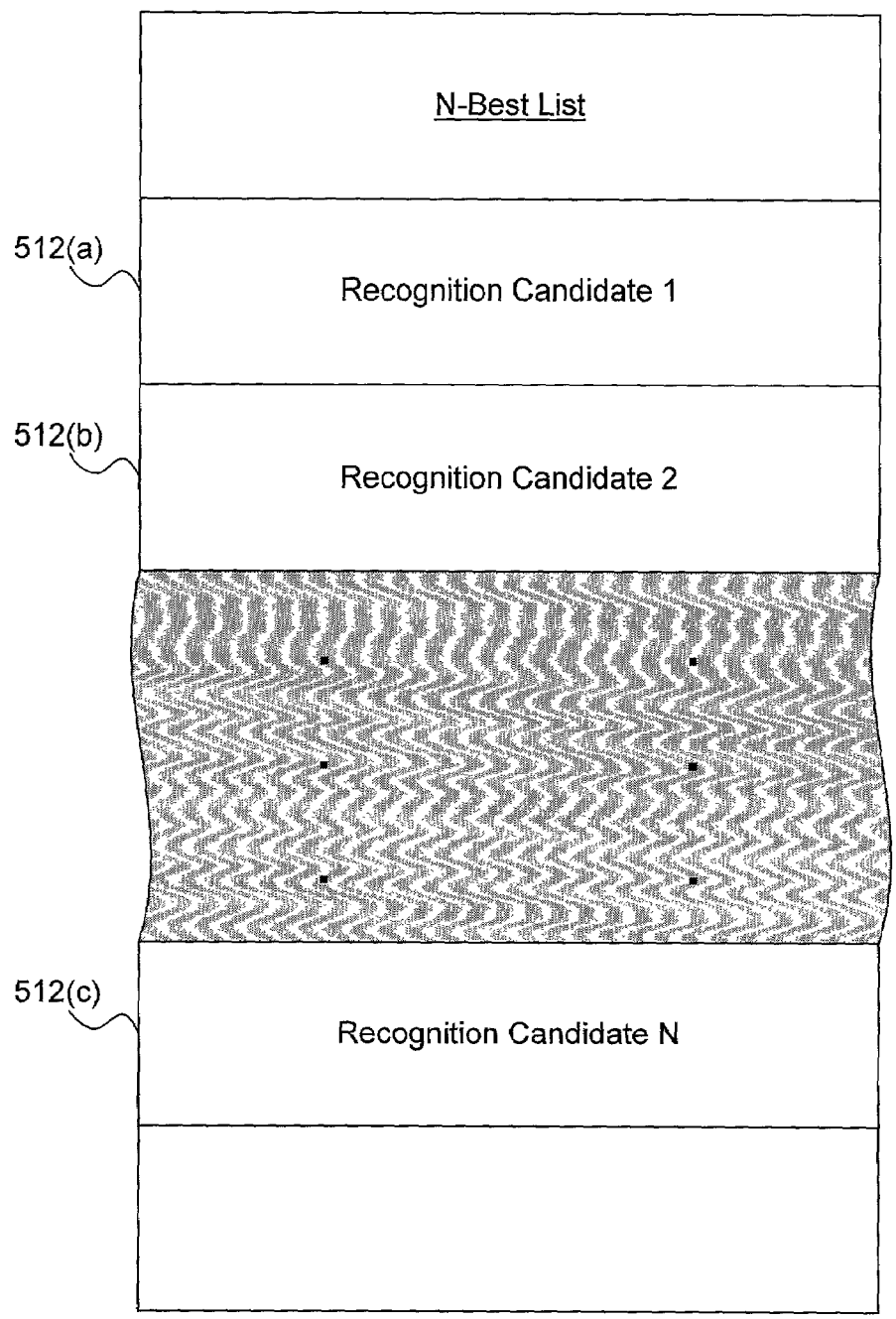
FIG. 5 is a block diagram of one embodiment of an N-best list, in accordance with the present invention.

Referring now to FIG. 5, a block diagram of an N-best list 510 is shown, in accordance with one embodiment of the present invention. In the FIG. 5 embodiment, N-best list 510 may preferably include a recognition candidate 1 (512(a)) through a recognition candidate N (512(c)). In alternate embodiments, N-best list 510 may readily include various other elements or functionalities in addition to, or instead of, those elements or functionalities discussed in conjunction with the FIG. 5 embodiment.

In the FIG. 5 embodiment, N-best list 510 may readily be implemented to include any desired number of recognition candidates 512 that may include any required type of information. In the FIG. 5 embodiment, each recognition candidate 512 may preferably include a search result (a word, phrase, or command) in text format, and a corresponding recognition score. In the FIG. 5 embodiment, the recognition candidates 512 of N-best list 510 are preferably sorted and ranked by their recognition score, with recognition candidate 1 (512(a)) having the highest or best recognition score, and recognition candidate N (512(c)) have the lowest or worst recognition score. The utilization of N-best list 510 is further discussed below in conjunction with FIGS. 6A through 8B.

Figure 6A:
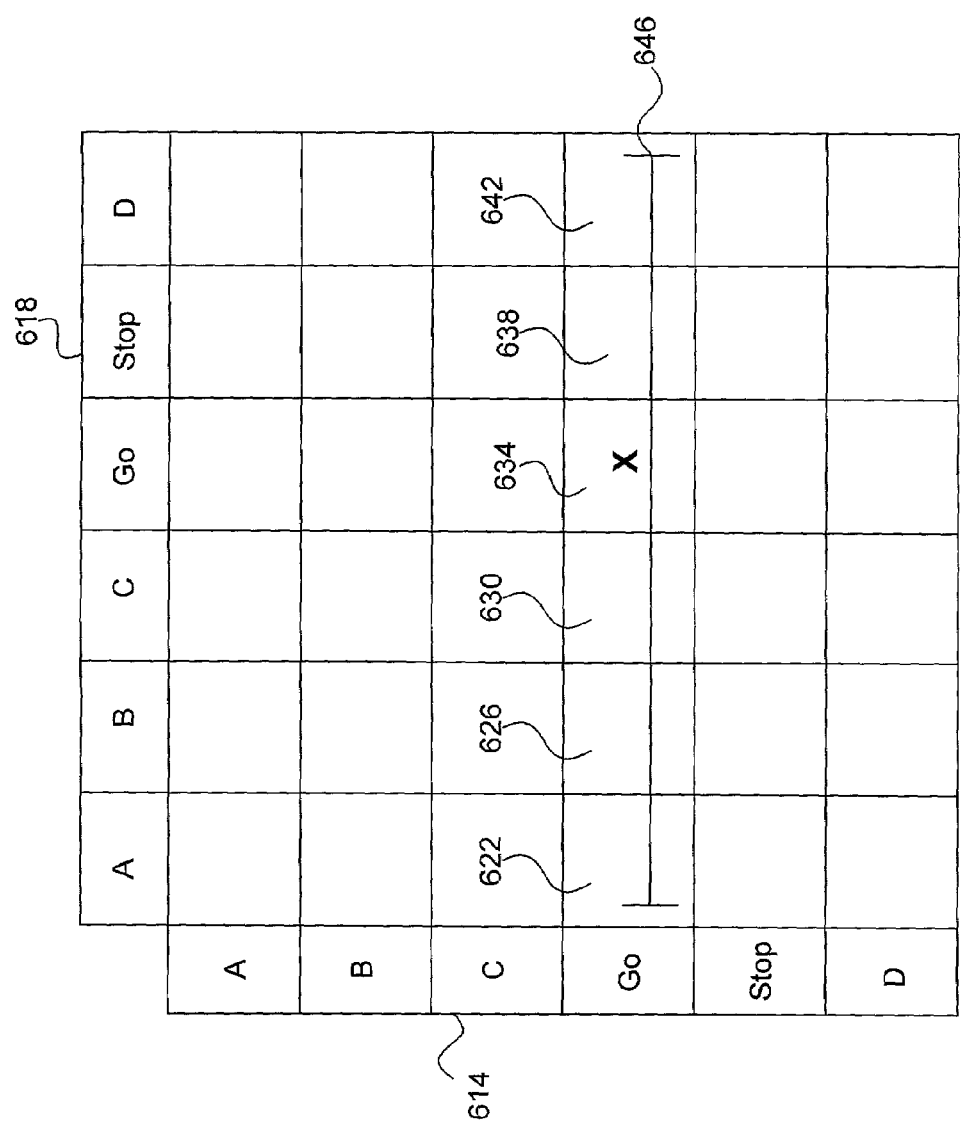
FIG. 6A is a block diagram for one embodiment of an acoustical matrix, in accordance with the present invention.

Referring now to FIG. 6A, a block diagram for one embodiment of an acoustical matrix 610 is shown, in accordance with the present invention. In alternate embodiments, acoustical matrix 610 may be implemented by utilizing various other elements, configurations, or functionalities in addition to, or instead of, those elements, configurations, or functionalities discussed in conjunction with the FIG. 6A embodiment.

In the FIG. 6A embodiment, acoustical matrix 610 may preferably be configured to include a series of input utterances 614 that may be provided to recognizer 314 for analysis and identification. In the FIG. 6A example, acoustical matrix 610 includes six input utterances 614 (A, B, C, Go, Stop, and D) that are vertically configured in rows of acoustical matrix 610. In alternate embodiments, acoustical matrix 610 may include any number of input utterances 614 that may include any desired sounds or words.

In addition, in the FIG. 6A example, acoustical matrix 610 includes six recognition results 618 (A, B, C, Go, Stop, and D) that may be identified as the top recognition candidates 512 from N-best lists 510 (FIG. 5). In the FIG. 6A embodiment, recognition results 618 are horizontally configured in columns of acoustical matrix 610. In alternate embodiments, acoustical matrix 610 may include any number of recognition results 618 that may include any desired sounds or words.

Acoustical matrix 610 may be populated by acoustical matrix values by adding the value "+1" to an appropriate acoustical matrix location each time a top recognition candidate 512 is identified as a recognition result 618 for a corresponding input utterance 614. For example, if an input utterance 614 is "Go", and recognizer 314 correctly generates a recognition result 618 of "Go", then a "+1" may preferably be added to location 634 of acoustical matrix 610. Similarly, if an input utterance 614 is "Go", and recognizer 314 incorrectly generates a recognition result 618 of "Stop", then a "+1" may preferably be added to location 638 of acoustical matrix 610. Acoustical matrix 610 preferably includes recognition information for all input utterances 614, and therefore may be utilized to generate an analysis of how many times various input utterances 614 are correctly or incorrectly identified.

In the FIG. 6A embodiment, an individual acoustical error value (Acoustical Error$_i$) for a given input utterance 614 may be calculated with information from an acoustical matrix row 646 by utilizing the following formula:

$$\text{Acoustical Error}_i = \Sigma\text{Incorrect}_i/(\text{Correct}_i + \Sigma\text{Incorrect}_i)$$

where Correct$_i$ is an acoustical matrix value for a correctly-identified recognition result 618 from an individual input utterance 614, and $\Sigma$ Incorrect$_i$ is the sum of all acoustical matrix values for incorrectly-identified recognition results 618 from an individual input utterance 614. For example, in the FIG. 6A example, to calculate an individual acoustical error value for an input utterance 614 "Go" by utilizing recognition information in acoustical matrix row 646, Correct$_i$ is equal to the acoustical matrix value in location 634, and $\Sigma$Incorrect$_i$ is equal to the sum of acoustical matrix values in locations 622, 626, 630, 638, and 642.

In the FIG. 6A embodiment, a total acoustical error value (Acoustical Error$_T$) for all input utterances 614 may be calculated by utilizing the following formula:

$$\text{Acoustical Error}_T = \Sigma\text{Incorrect}_T/(\Sigma\text{Correct}_T + \Sigma\text{Incorrect}_T)$$

where Correct$_T$ is sum of all acoustical matrix values for correctly-identified recognition results 618 from all input utterances 614, and $\Sigma$Incorrect$_T$ is a sum of all acoustical matrix values for incorrectly-identified recognition results 618 from all input utterances 614. In certain embodiments, the present invention may advantageously compare the foregoing total acoustical error value to a predetermined threshold value to determine whether a particular vocabulary set is optimized, as discussed below in conjunction with FIG. 8B.

In certain embodiments, an accuracy value (Accuracy) may be calculated from a corresponding error value (Error) (such as the foregoing individual acoustical error values or total acoustical error values) by utilizing the following formula:

$$\text{Error} = 1 - \text{Accuracy}$$

In various embodiments of the present invention, either error values or accuracy values may thus be alternately utilized to evaluate individual or total utterance recognition characteristics. In certain instances, such alternate values may therefore be referred to herein by utilizing the terminology "Error/Accuracy".

Figure 6B:
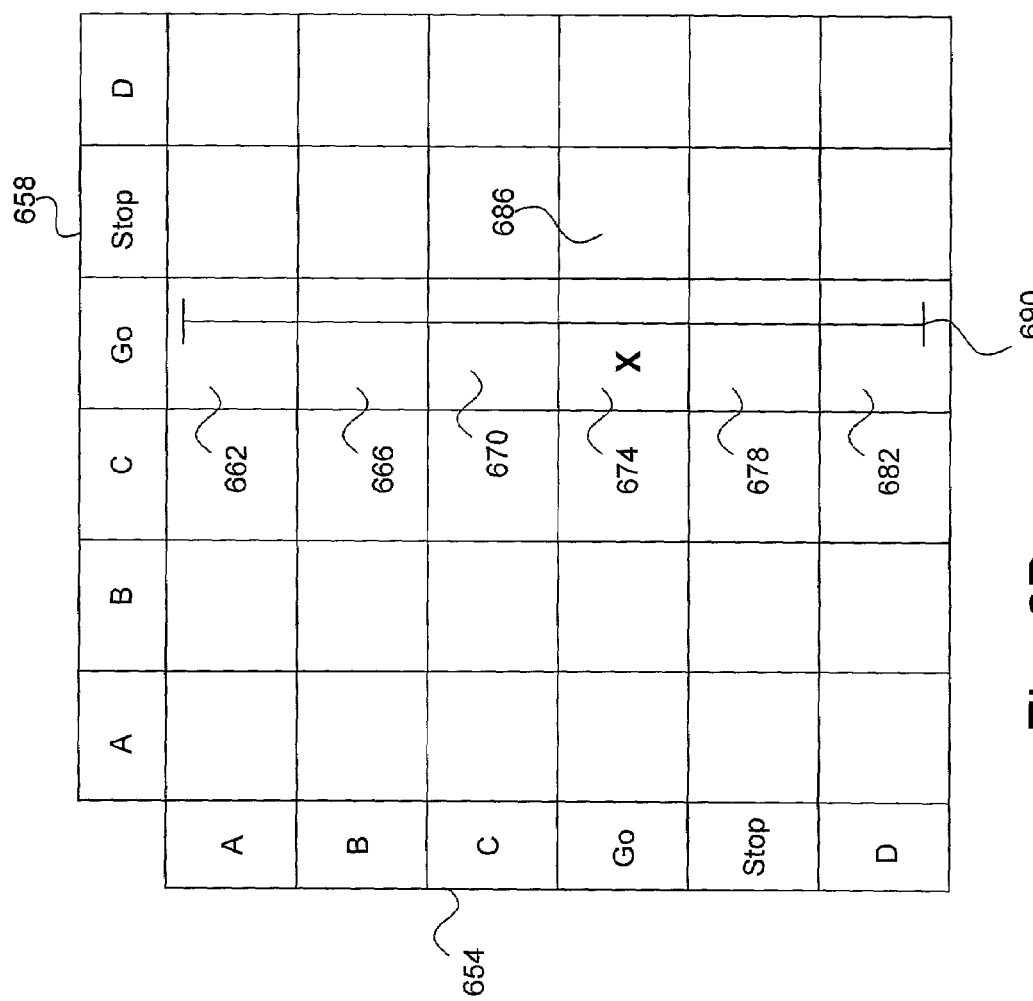
FIG. 6B is a block diagram for one embodiment of a lexical matrix, in accordance with the present invention.

Referring now to FIG. 6B, a block diagram for one embodiment of a lexical matrix 650 is shown, in accordance with the present invention. In alternate embodiments, lexical matrix 650 may be implemented by utilizing various other elements, configurations, or functionalities in addition to, or instead of, those elements, configurations, or functionalities discussed in conjunction with the FIG. 6B embodiment.

In the FIG. 6B embodiment, lexical matrix 650 may preferably be configured to include a series of input utterances 654 that may be provided to recognizer 314 for analysis and identification. In the FIG. 6B example, lexical matrix 650 includes six input utterances 654 (A, B, C, Go, Stop, and D) that are vertically configured in rows of lexical matrix 650. In alternate embodiments, lexical matrix 650 may include any number of input utterances 654 that may include any desired sounds or words.

In addition, in the FIG. 6B example, lexical matrix 650 includes six recognition results 658 (A, B, C, Go, Stop, and D) that may be identified as the top recognition candidates 512(*a*) from N-best lists 510 (FIG. 5). In the FIG. 6B embodiment, recognition results 658 are horizontally configured in columns of lexical matrix 650. In alternate embodiments, lexical matrix 650 may include any number of recognition results 658 that may include any desired sounds or words.

Lexical matrix 650 may be populated by lexical matrix values by adding the value "+1" to a lexical matrix location corresponding to the recognition result 658 of the top recognition candidate 512 and a particular input utterance 654, but only when the top recognition candidate 512(*a*) is incorrectly identified by recognizer, and when a second-highest recognition candidate 512(*b*) from N-best list 510 is the correct recognition result 658 for the particular input utterance 645. For example, if an input utterance 614 is "Go", and recognizer 314 incorrectly generates a top recognition candidate 512(*a*) of "Stop", and also generates a second-highest recognition candidate 512(*b*) of "Go", then a "+1" may preferably be added to location 686 of acoustical matrix 610. Lexical matrix 650 preferably includes recognition information for all input utterances 614.

In the FIG. 6B embodiment, an individual lexical error value (Lexical Error$_j$) for a given recognition result 658 may be calculated with information from lexical matrix column 690 by utilizing the following formula:

$$\text{Lexical Error}_j = \Sigma \text{Incorrect}_j / (\text{Correct}_i + \Sigma \text{Incorrect}_i)$$

where $\Sigma \text{Incorrect}_j$ is the sum of all lexical matrix values for incorrectly-identified input utterances 654 for a particular recognition result 658 (that have the correct recognition result as a second-highest recognition candidate 512(*b*)), Correct$_i$ is an acoustical matrix value for a correctly-identified recognition result 618 from an individual input utterance 614, and $\Sigma \text{Incorrect}_i$ is the sum of all acoustical matrix values for incorrectly-identified recognition results 618 from an individual input utterance 614. For example, in the FIG. 6B example, to calculate an individual lexical error value for a recognition result 658 of "Go" by utilizing recognition information in lexical matrix column 690, $\Sigma \text{Incorrect}_j$ is equal to the sum of lexical matrix values in locations 662, 666, 670, 678, and 682.

In accordance with certain embodiments of the present invention, the foregoing individual lexical error value (Lexical Error$_j$) may be combined with the individual acoustical error value of FIG. 6A to produce a composite Acoustical-Lexical Error (Acoustical-Lexical Error) for producing an utterance ranking that is further discussed below in conjunction with FIG. 7. In certain embodiments, the foregoing composite Acoustical-Lexical Error may be calculated according to the following formula:

$$\text{Acoustical-Lexical Error} = \text{Acoustical Error}_i + \text{Lexical Error}_j$$

As previously discussed, in certain embodiments, an accuracy value (Accuracy) may be calculated from a corresponding error value (Error) (such as the foregoing individual acoustical error values or individual lexical error values) by utilizing the following formula:

$$\text{Error} = 1 - \text{Accuracy}$$

In various embodiments of the present invention, either error values or accuracy values may thus be alternately utilized to evaluate individual or total utterance recognition characteristics. In certain instances, such alternate values may therefore be referred to herein by utilizing the terminology "Error/Accuracy".

In accordance with certain embodiments of the present invention, an individual composite acoustical-lexical accuracy value (Acoustical-Lexical Accuracy) for a given input utterance may be utilized for producing an utterance ranking that is further discussed below in conjunction with FIG. 7. In certain embodiments, the foregoing Acoustical-Lexical Accuracy may be calculated according to the following formula:

$$\text{Acoustical-Lexical Accuracy} = (\text{Correct}_i - \Sigma \text{Incorrect}_j) / (\text{Correct}_i + \Sigma \text{Incorrect}_i)$$

where Correct$_i$ is an acoustical matrix value for a correctly-identified recognition result 618 and a particular input utterance 614, $\Sigma \text{Incorrect}_j$ is the sum of all lexical matrix values for incorrectly-identified input utterances 654 for a particular recognition result 658 (that have the correct recognition result as a second-highest recognition candidate 512(*b*), and $\Sigma \text{Incorrect}_i$ is the sum of all acoustical matrix values for incorrectly-identified recognition results 618 from an individual input utterance 614.

Figure 7:
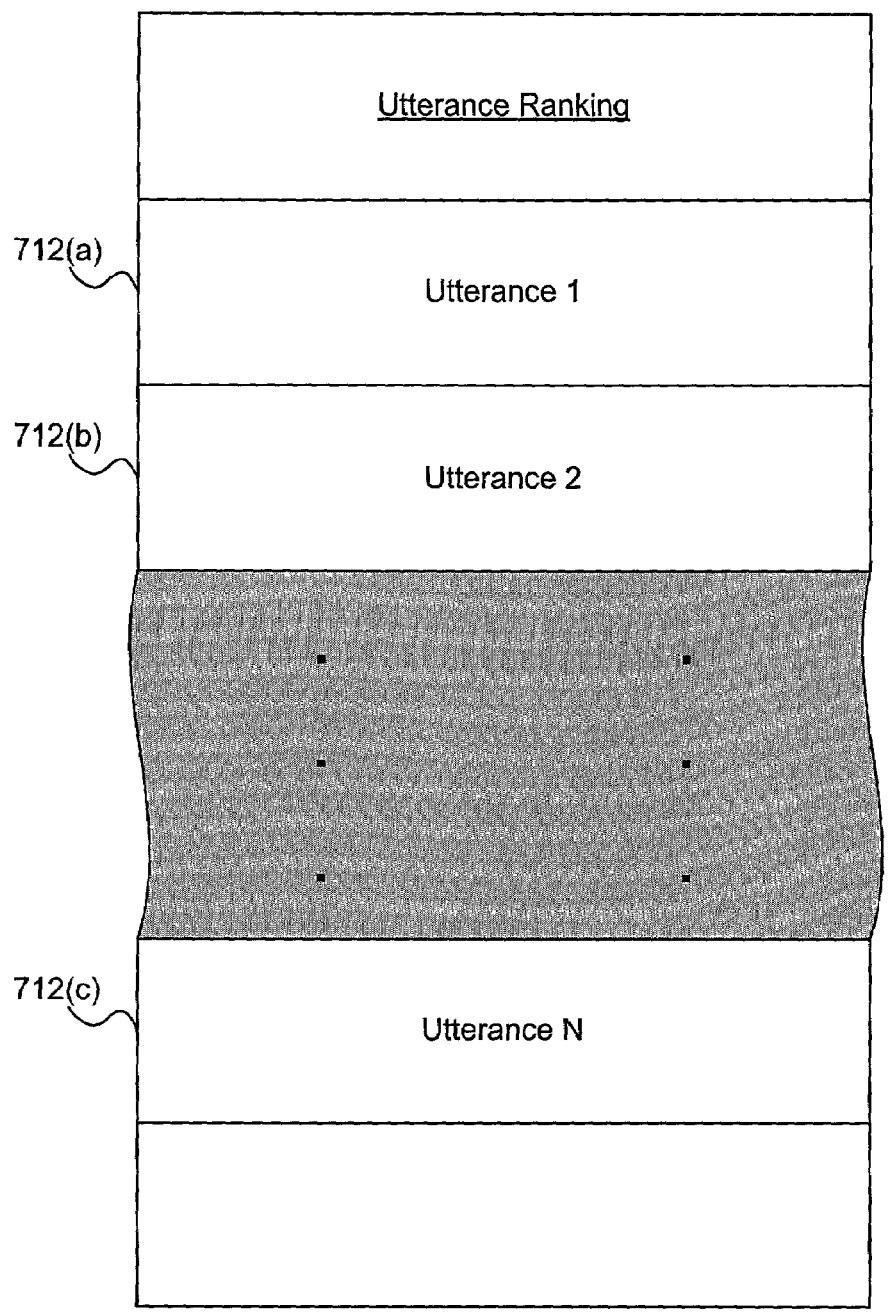
FIG. 7 is a block diagram of one embodiment of an utterance ranking, in accordance with the present invention.

Referring now to FIG. 7, a block diagram of an utterance ranking 710 is shown, in accordance with one embodiment of the present invention. In the FIG. 7 embodiment, utterance ranking 710 may preferably include an utterance 1 (712(*a*)) through an utterance N (712(*c*)). In alternate embodiments, utterance ranking 710 may readily include various other elements, configurations, or functionalities in addition to, or instead of, those elements, configurations, or functionalities discussed in conjunction with the FIG. 7 embodiment.

In the FIG. 7 embodiment, utterance ranking 710 may readily be implemented to include any desired number of utterances 712 in any suitable format. In the FIG. 7 embodiment, the utterances 712 of utterance ranking 710 are preferably sorted and ranked by their respective individual composite acoustical-lexical error or by their respective individual composite acoustical-lexical accuracy, with utterance 1 (712(*a*)) having the best individual composite acoustical-lexical error or individual composite acoustical-lexical accuracy, and utterance N (512(*c*)) have the worst individual composite acoustical-lexical error or individual composite acoustical-lexical accuracy. The derivation and utilization of utterance ranking 710 is further discussed below in conjunction with FIGS. 8A and 8B.

Figure 8A:
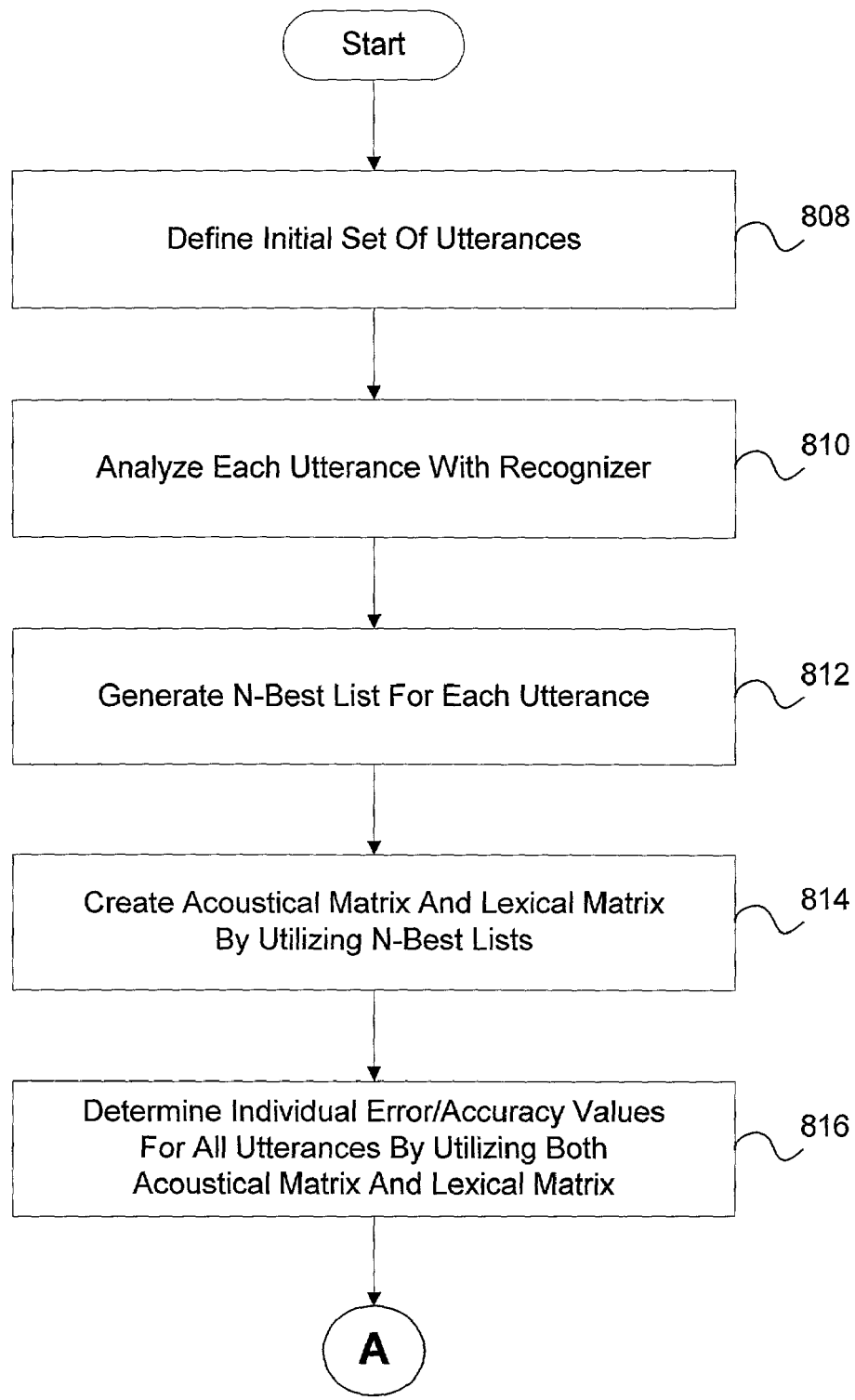
FIG. 8A is a flowchart of initial method steps for implementing a speech recognition vocabulary set, according to one embodiment of the present invention.

Referring now to FIG. 8A, a flowchart of initial method steps for implementing a speech recognition vocabulary set is shown, in accordance with one embodiment of the present invention. The FIG. 8A embodiment is presented for purposes of illustration, and in alternate embodiments, the present invention may readily utilize various steps and sequences other than those discussed in conjunction with the FIG. 8A embodiment.

In the FIG. 8A embodiment, in step 808, a system designer or other appropriate entity may preferably define an initial set of utterances for use with speech detector 210. In certain embodiments, the initial set of utterances may preferably include various tasks for recognition by speech detector 210, and may also preferably include alternative commands corresponding to each of the various tasks.

In step 810, recognizer 314 may preferably analyze each utterance by comparing the utterances to word models of a vocabulary set from model bank 412 (FIG. 4) to thereby generate a corresponding model score for each of the utterances. Then, in step 812, recognizer 314 may preferably generate an N-best list 510 for each utterance by ranking the utterances according to respective model scores.

In step 814, an acoustical matrix 610 and a lexical matrix 650 may preferably be created by utilizing any appropriate means. For example, acoustical matrix 610 and lexical matrix 650 may be created by utilizing the foregoing N-best lists, as discussed above in conjunction with FIGS. 6A and 6B. In step 816, individual error/accuracy values may preferably be determined for all utterances by utilizing any effective techniques. For example, composite individual error/accuracy values may preferably be determined by utilizing both acoustical matrix 610 and lexical matrix 650, as discussed above in conjunction with FIGS. 6A and 6B. The FIG. 8A process may then preferably advance to step 820 of FIG. 8B (letter A).

Figure 8B:
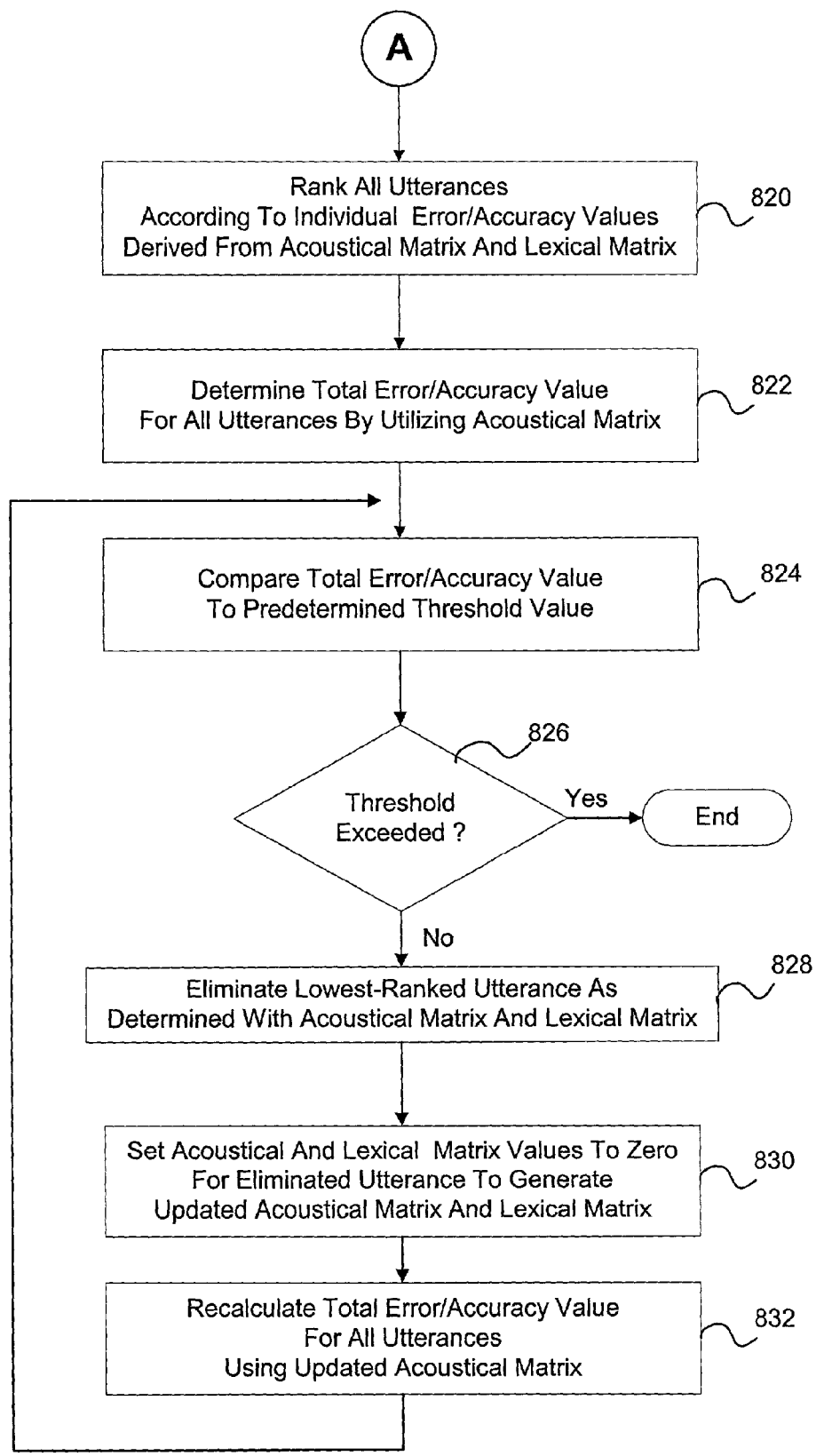
FIG. 8B is a flowchart of final method steps for implementing a speech recognition vocabulary set, according to one embodiment of the present invention.

Referring now to FIG. 8B, a flowchart of final method steps for implementing a speech recognition vocabulary set is shown, in accordance with one embodiment of the present invention. The FIG. 8B embodiment is presented for purposes of illustration, and in alternate embodiments, the present invention may readily utilize various steps and sequences other than those discussed in conjunction with the FIG. 8B embodiment.

In the FIG. 8B embodiment, in step 820, all utterances may be ranked in an utterance ranking 710 (FIG. 7) according to individual error/accuracy values that may preferably be derived from both acoustical matrix 610 and lexical matrix 650, as discussed above in conjunction with FIG. 7. Then, in step 822, a total error/accuracy value for all utterances may be determined by utilizing acoustical matrix 610, as discussed above in conjunction with FIG. 6A.

In step 824, the foregoing total error/accuracy value may preferably be compared with a predetermined threshold value which may be selected to provide a desired level of recognition accuracy in speech detector 210. In step 826, a determination may preferably be made regarding whether the foregoing threshold value has been exceeded by the total error/accuracy value. If the predetermined threshold value has been exceeded by the total error/accuracy value, then the FIG. 8B process may preferably terminate. In the case of a total error value, the total error value must be less than the predetermined threshold, and conversely, in the case of a total accuracy value, the total accuracy value must be greater than the predetermined threshold However, if the predetermined threshold value has not been exceeded by the total error/accuracy value, then in step 828, a lowest-ranked utterance 712 from utterance ranking 710 may preferably be eliminated. In certain embodiments, multiple low-ranking utterances 712 may be eliminated. Then, in step 830, acoustical matrix values from acoustical matrix 610 and lexical matrix values from lexical matrix 650 may preferably be set to zero for the eliminated lowest-ranked utterance to thereby generate an updated acoustical matrix 610 and an updated lexical matrix 650.

In step 832, the total error/accuracy value for all remaining utterances may preferably be recalculated by using acoustical matrix values from the updated acoustical matrix 610. The FIG. 8B process may then preferably return to step 824 to repeatedly eliminate lowest-ranked utterances from utterance ranking 710 until the predetermined threshold value is exceeded, and the FIG. 8B process terminates.

In certain alternate embodiments, after eliminating a lowest-ranked utterance from utterance ranking 710 in step 828, instead of progressing to step 830 of FIG. 8B, the present invention may alternatively return to step 810 of FIG. 8A to reanalyze each remaining utterance, and generate new N-best lists 510 which may in turn be utilized to create a new acoustical matrix 610 and a new lexical matrix 650 for ranking the remaining utterances.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for implementing a vocabulary set for a speech recognizer, comprising:
    a recognizer for analyzing utterances from said vocabulary set to generate N-best lists of recognition candidates;
    an acoustical matrix configured to relate said utterances to top recognition candidates from said N-best lists;
    a lexical matrix configured to relate said utterances to said top recognition candidates from said N-best lists only when second-highest recognition candidates from said N-best lists are correct recognition results; and
    an utterance ranking created according to composite individual error/accuracy values for each of said utterances, said composite individual error/accuracy values being derived from both said acoustical matrix and said lexical matrix, a lowest-ranked utterance being eliminated from said vocabulary set when a total error/accuracy value for all of said utterances does not exceed a predetermined threshold.

2. The system of claim 1 wherein an initial set of said utterances from said vocabulary set are defined based upon intended tasks of said speech recognizer.

3. The system of claim 2 wherein each of said intended tasks of said speech recognizer is associated with one or more alternative commands for requesting said intended tasks.

4. The system of claim 1 wherein said recognizer analyzes each of said utterances by comparing said utterances with word models of said vocabulary set to generate recognition scores.

5. The system of claim 4 wherein said recognizer creates said N-best lists to rank said recognition candidates for each of said utterances according to said recognition scores.

6. The system of claim 1 wherein said acoustical matrix includes input utterances that are vertically configured in said acoustical matrix, and recognition results that are horizontally configured in said acoustical matrix, said acoustical matrix being populated by acoustical matrix values by adding a value of 1 to a corresponding acoustical matrix location each time one of said top recognition candidates is identified as a recognition result for a corresponding one of said input utterances.

7. The system of claim 1 wherein an individual acoustical error value, Acoustical Error$_i$, for an input utterance may be calculated with information from an acoustical matrix row by utilizing a formula:

Acoustical Error$_i$=ΣIncorrect$_i$/(Correct$_i$+ΣIncorrect$_i$)

where said Correct$_i$ is an acoustical matrix value for a correctly-identified recognition result from said input utterance, and said ΣIncorrect$_i$ is a sum of all acoustical matrix values for incorrectly-identified recognition results from said input utterance.

8. The system of claim 1 wherein said lexical matrix includes input utterances that are vertically configured in said lexical matrix, and recognition results that are horizontally configured in lexical matrix, said lexical matrix being populated by lexical matrix values by adding a value of 1 to a lexical matrix location for a recognition result of one of said top recognition candidates and an input utterance, but only when said one of said top recognition candidates is incorrectly identified by said recognizer, and a corresponding one of said second-highest recognition candidates is a correct recognition result for said input utterance.

9. The system of claim 1 wherein an individual lexical error value, Lexical Error$_j$, for one of said recognition results may be calculated from a lexical matrix column by utilizing a formula:

Lexical Error$_j$=ΣIncorrect$_j$/(Correct$_i$+ΣIncorrect$_i$)

where said ΣIncorrect$_j$ is a sum of all lexical matrix values for incorrectly-identified input utterances for a particular recognition result that have the correct recognition result as a second-highest recognition candidate, said Correct$_i$ is an acoustical matrix value for a correctly-identified recognition result from an individual input utterance, and said ΣIncorrect$_i$ is a sum of all acoustical matrix values for incorrectly-identified recognition results from said individual input utterance.

10. The system of claim 1 wherein said composite individual error/accuracy values for each of said utterances are implemented as a composite Acoustical-Lexical Error that is calculated according to a formula:

Acoustical-Lexical Error=Acoustical Error$_i$+Lexical Error$_j$ where said Acoustical Error$_i$ is an individual acoustical error value for one of said utterances from said acoustical matrix, and said Lexical Error$_j$ is an individual lexical error value for said one of said utterances from said lexical matrix.

11. The system of claim 1 wherein said composite individual error/accuracy values for each of said utterances are implemented as an Acoustical-Lexical Accuracy that is calculated according to a formula:

Acoustical-Lexical Accuracy=(Correct$_i$-ΣIncorrect$_j$)/(Correct$_i$+ΣIncorrect$_i$)

where said Correct$_i$ is an acoustical matrix value for a correctly-identified recognition result and an input utterance, said ΣIncorrect$_j$ is a sum of all lexical matrix values for incorrectly-identified input utterances for a recognition result that has a correct recognition result as one of said second-highest recognition candidates, and said ΣIncorrect$_i$ is a summation of all acoustical matrix values for incorrectly-identified recognition results from said input utterance.

12. The system of claim 1 wherein said utterances of said utterance ranking are preferably ranked by respective individual composite acoustical-lexical error values, or by respective individual composite acoustical-lexical accuracy values, with said lowest-ranked utterance having a lowest individual composite acoustical-lexical error value, or a lowest individual composite acoustical-lexical accuracy value.

13. The system of claim 1 wherein said total error/accuracy value for all of said utterances is implemented as a total acoustical error value, Acoustical Error$_T$, that is calculated according to a formula:

Acoustical Error$_T$=ΣIncorrect$_T$/(ΣCorrect$_T$+ΣIncorrect$_T$)

where said Correct$_T$ is a sum from said acoustical matrix for correctly-identified recognition results from all input utterances, and said ΣIncorrect$_T$ is a summation from said acoustical matrix for incorrectly-identified recognition results from said all input utterances.

14. The system of claim 1 wherein accuracy values, Accuracy, may be calculated from corresponding error values, Error, to implement said composite individual error/accuracy values or said total error/accuracy value according to a formula:

Error=1−Accuracy where either said error values or said accuracy values are alternately utilized to evaluate individual or total utterance recognition characteristics for said speech recognizer.

15. The system of claim 1 wherein said total error/accuracy value is compared to said predetermined threshold to determine whether said vocabulary set is optimized, said predetermined threshold being selected to produce desired speech recognition performance characteristics in said speech recognizer.

16. The system of claim 1 wherein said vocabulary set is finalized when said total error/accuracy value is implemented as a total error value and said predetermined threshold is greater than said total error value, or when said total error/accuracy value is implemented as a total accuracy value and said predetermined threshold is less than said total accuracy value.

17. The system of claim 1 wherein multiple lower-ranked utterances are eliminated from said utterance ranking when said total error/accuracy value for all of said utterances does not exceed said predetermined threshold.

18. The system of claim 1 wherein acoustical matrix values from said acoustical matrix and lexical matrix values from said lexical matrix are set to zero for said lowest-ranked utterance to thereby generate an updated acoustical matrix and an updated lexical matrix.

19. The system of claim 18 wherein said total error/accuracy value for all remaining utterances is repeatedly recalculated by using revised acoustical matrix values from said updated acoustical matrix, said total error/accuracy value then being iteratively recalculated to eliminate lower ranked utterances from said vocabulary set until said predetermined threshold value is exceeded.

20. The system of claim 1 wherein, after eliminating said lowest-ranked utterance from said vocabulary set, said recognizer reanalyzes remaining utterances from said vocabulary set, and responsively generates new N-best lists which may then be utilized to create a new acoustical matrix and a new lexical matrix for ranking said remaining utterances.

21. A method for implementing a vocabulary set for a speech recognizer, comprising the steps of:

analyzing utterances from said vocabulary set with a recognizer to generate N-best lists of recognition candidates;

relating said utterances to top recognition candidates from said N-best lists with an acoustical matrix;

compiling a lexical matrix that relates said utterances to said top recognition candidates from said N-best lists only when second-highest recognition candidates from said N-best lists are correct recognition results; and creating an utterance ranking according to composite individual error/accuracy values for each of said utterances, said composite individual error/accuracy values being derived from both said acoustical matrix and said lexical matrix, a lowest-ranked utterance being eliminated from said vocabulary set when a total error/accuracy value for all of said utterances does not exceed a predetermined threshold.

22. The method of claim 21 wherein an initial set of said utterances from said vocabulary set are defined based upon intended tasks of said speech recognizer.

23. The method of claim 22 wherein each of said intended tasks of said speech recognizer is associated with one or more alternative commands for requesting said intended tasks.

24. The method of claim 21 wherein said recognizer analyzes each of said utterances by comparing said utterances with word models of said vocabulary set to generate recognition scores.

25. The method of claim 24 wherein said recognizer creates said N-best lists to rank said recognition candidates for each of said utterances according to said recognition scores.

26. The method of claim 21 wherein said acoustical matrix includes input utterances that are vertically configured in said acoustical matrix, and recognition results that are horizontally configured in said acoustical matrix, said acoustical matrix being populated by acoustical matrix values by adding a value of 1 to a corresponding acoustical matrix location each time one of said top recognition candidates is identified as a recognition result for a corresponding one of said input utterances.

27. The method of claim 21 wherein an individual acoustical error value, Acoustical Error$_i$, for an input utterance may be calculated with information from an acoustical matrix row by utilizing a formula:

$$\text{Acoustical Error}_i = \Sigma \text{Incorrect}_j / (\text{Correct}_i + \Sigma \text{Incorrect}_i)$$

where said Correct$_i$ is an acoustical matrix value for a correctly-identified recognition result from said input utterance, and said $\Sigma$Incorrect$_i$ is a sum of all acoustical matrix values for incorrectly-identified recognition results from said input utterance.

28. The method of claim 21 wherein said lexical matrix includes input utterances that are vertically configured in said lexical matrix, and recognition results that are horizontally configured in lexical matrix, said lexical matrix being populated by lexical matrix values by adding a value of 1 to a lexical matrix location for a recognition result of one of said top recognition candidates and an input utterance, but only when said one of said top recognition candidates is incorrectly identified by said recognizer, and a corresponding one of said second-highest recognition candidates is a correct recognition result for said input utterance.

29. The method of claim 21 wherein an individual lexical error value, Lexical Error$_j$, for one of said recognition results may be calculated from a lexical matrix column by utilizing a formula:

$$\text{Lexical Error}_j = \Sigma \text{Incorrect}_j / (\text{Correct}_i + \Sigma \text{Incorrect}_i)$$

where said $\Sigma$Incorrect$_j$ is a sum of all lexical matrix values for incorrectly-identified input utterances for a particular recognition result that have the correct recognition result as a second-highest recognition candidate, said Correct$_i$ is an acoustical matrix value for a correctly-identified recognition result from an individual input utterance, and said $\Sigma$Incorrect$_i$ is a sum of all acoustical matrix values for incorrectly-identified recognition results from said individual input utterance.

30. The method of claim 21 wherein said composite individual error/accuracy values for each of said utterances are implemented as a composite Acoustical-Lexical Error that is calculated according to a formula:

$$\text{Acoustical-Lexical Error} = \text{Acoustical Error}_i + \text{Lexical Error}_j$$

where said Acoustical Error$_i$ is an individual acoustical error value for one of said utterances from said acoustical matrix, and said Lexical Error$_j$ is an individual lexical error value for said one of said utterances from said lexical matrix.

31. The method of claim 21 wherein said composite individual error/accuracy values for each of said utterances are implemented as an Acoustical-Lexical Accuracy that is calculated according to a formula:

$$\text{Acoustical-Lexical Accuracy} = (\text{Correct}_i - \Sigma \text{Incorrect}_j) / (\text{Correct}_i + \Sigma \text{Incorrect}_i)$$

where said Correct$_i$ is an acoustical matrix value for a correctly-identified recognition result and an input utterance, said $\Sigma$Incorrect$_j$ is a sum of all lexical matrix values for incorrectly-identified input utterances for a recognition result that has a correct recognition result as one of said second-highest recognition candidates, and said $\Sigma$Incorrect$_i$ is a summation of all acoustical matrix values for incorrectly-identified recognition results from said input utterance.

32. The method of claim 21 wherein said utterances of said utterance ranking are preferably ranked by respective individual composite acoustical-lexical error values, or by respective individual composite acoustical-lexical accuracy values, with said lowest-ranked utterance having a lowest individual composite acoustical-lexical error value, or a lowest individual composite acoustical-lexical accuracy value.

33. The method of claim 21 wherein said total error/accuracy value for all of said utterances is implemented as a total acoustical error value, Acoustical Error$_T$, that is calculated according to a formula:

$$\text{Acoustical Error}_T = \Sigma \text{Incorrect}_T / (\Sigma \text{Correct}_T + \Sigma \text{Incorrect}_T)$$

where said Correct$_T$ is a sum from said acoustical matrix for correctly-identified recognition results from all input utterances, and said $\Sigma$Incorrect$_T$ is a summation from said acoustical matrix for incorrectly-identified recognition results from said all input utterances.

34. The method of claim 21 wherein accuracy values, Accuracy, may be calculated from corresponding error values, Error, to implement said composite individual error/accuracy values or said total error/accuracy value according to a formula:

$$\text{Error} = 1 - \text{Accuracy}$$

where either said error values or said accuracy values are alternately utilized to evaluate individual or total utterance recognition characteristics for said speech recognizer.

35. The method of claim 21 wherein said total error/accuracy value is compared to said predetermined threshold to determine whether said vocabulary set is optimized, said predetermined threshold being selected to produce desired speech recognition performance characteristics in said speech recognizer.

36. The method of claim 21 wherein said vocabulary set is finalized when said total error/accuracy value is implemented as a total error value and said predetermined threshold is greater than said total error value, or when said total error/accuracy value is implemented as a total accuracy value and said predetermined threshold is less than said total accuracy value.

37. The method of claim 21 wherein multiple lower-ranked utterances are eliminated from said utterance ranking when said total error/accuracy value for all of said utterances does not exceed said predetermined threshold.

38. The method of claim 21 wherein acoustical matrix values from said acoustical matrix and lexical matrix values from said lexical matrix are set to zero for said lowest-ranked utterance to thereby generate an updated acoustical matrix and an updated lexical matrix.

39. The method of claim 38 wherein said total error/accuracy value for all remaining utterances is repeatedly recalculated by using revised acoustical matrix values from said updated acoustical matrix, said total error/accuracy value then being iteratively recalculated to eliminate lower ranked utterances from said vocabulary set until said predetermined threshold value is exceeded.

40. The method of claim 21 wherein, after eliminating said lowest-ranked utterance from said vocabulary set, said recognizer reanalyzes remaining utterances from said vocabulary set, and responsively generates new N-best lists which may then be utilized to create a new acoustical matrix and a new lexical matrix for ranking said remaining utterances.

41. A computer-readable medium comprising program instructions for implementing a vocabulary set for a speech recognizer, by performing the steps of:
analyzing utterances from said vocabulary set with a recognizer to generate N-best lists of recognition candidates;
relating said utterances to top recognition candidates from said N-best lists with an acoustical matrix;
compiling a lexical matrix that relates said utterances to said top recognition candidates from said N-best lists only when second-highest recognition candidates from said N-best lists are correct recognition results; and
creating an utterance ranking according to composite individual error/accuracy values for each of said utterances, said composite individual error/accuracy values being derived from both said acoustical matrix and said lexical matrix, a lowest-ranked utterance being eliminated from said vocabulary set when a total error/accuracy value for all of said utterances does not exceed a predetermined threshold.

42. A system for implementing a vocabulary set for a speech recognizer, comprising the steps of:
means for analyzing utterances from said vocabulary set to generate N-best lists of recognition candidates;
means for relating said utterances to top recognition candidates from said N-best lists;
means for correlating said utterances to said top recognition candidates from said N-best lists only when second-highest recognition candidates from said N-best lists are correct recognition results; and
means for ranking said utterances according to composite individual error/accuracy values for each of said utterances, said composite individual error/accuracy values being derived from both said means for relating and said means for correlating, a lowest-ranked utterance being eliminated from said vocabulary set when a total error/accuracy value for all of said utterances does not exceed a predetermined threshold.

43. A system for implementing a vocabulary set for a speech recognizer, comprising:
a recognizer for analyzing utterances from said vocabulary set to generate recognition candidates;
an acoustical matrix configured to relate said utterances to top recognition candidates;
a lexical matrix configured to relate said utterances to said top recognition candidates only when second-highest recognition candidates are correct recognition results; and
an utterance ranking of said utterances based upon both said acoustical matrix and said lexical matrix, a lowest-ranked utterance being eliminated from said vocabulary set when a recognition accuracy for all of said utterances fails to exceed a predetermined threshold.

* * * * *